UNITED STATES PATENT OFFICE.

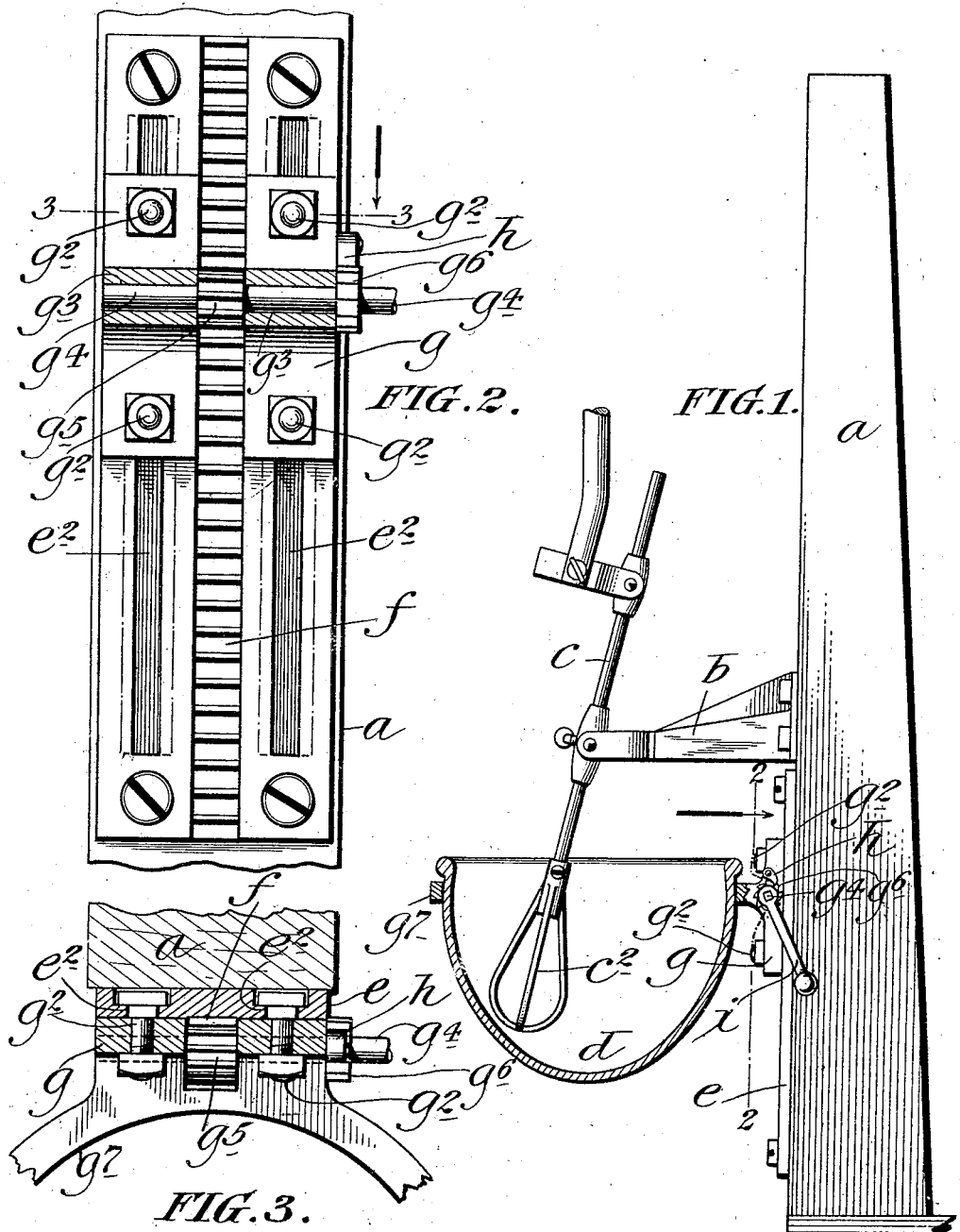

WILLIAM R. CHITTENDEN, OF JERSEY CITY, NEW JERSEY, ASSIGNOR OF ONE-HALF TO GUSTAV H. MARTIN, OF JERSEY CITY, NEW JERSEY.

EGG-BEATING MACHINE.

No. 890,604.     Specification of Letters Patent.     Patented June 16, 1908.

Application filed August 9, 1907. Serial No. 387,805.

*To all whom it may concern:*

Be it known that I, WILLIAM R. CHITTENDEN, a citizen of the United States, and residing at Jersey City, in the county of Hudson and State of New Jersey, have invented certain new and useful Improvements in Egg-Beating Machines, of which the following is a specification, such as will enable those skilled in the art to which it appertains to make and use the same.

This invention relates to egg beating machines of the class described and claimed in United States Letters Patents Nos. 768,086 granted August 23, 1904 and 843,309 granted February 5, 1907; and the object thereof is to provide improved means for connecting the egg receiving bowl with the framework of the machine so that said bowl may be detached or placed in position whenever desired without the necessity of disconnecting or detaching or moving other parts of the machine.

The invention is fully disclosed in the following specification, of which the accompanying drawing forms a part, in which the separate parts of my improvement are designated by suitable reference characters in each of the views, and in which:—

Figure 1 is a side view of a part of an egg beating machine of the class specified and showing my improvement applied thereto; Fig. 2 is a sectional front view thereof on the line 2—2 of Fig. 1; and, Fig. 3 a section on the line 3—3 of Fig. 2.

In the accompanying drawing, I have shown at $a$ the upright support of the egg beating machine of the class specified, and said support is provided with a forwardly directed arm $b$ in which is mounted a gyrating shaft $c$ provided at its lower end with a beater $c^2$. I have also shown at $d$ an egg receiving bowl, and, in practice, the eggs to be beaten are placed in the bowl $d$ and the shaft $c$ is gyrated and the beater $c^2$ moved rapidly around and within the bowl $d$, all as shown and described in the patents hereinbefore referred to, and it will be understood that these parts and the means for operating the shaft $c$ form no part of this invention.

In machines of the class specified, and as heretofore constructed, the removal of the bowl $d$ and the placing of said bowl in position is very difficult for the reason that in order to do so the shaft $c$ must be raised and the beater $c^2$ detached therefrom, and the object of this invention is to avoid these difficulties by providing a vertically movable support for the bowl $d$ which may be raised and lowered, whenever desired, so as to facilitate the detachment of the bowl $d$, or the replacing of said bowl in position.

In the practice of my invention, I secure to the support $a$ a vertically arranged plate $e$ having vertically arranged parallel slots $e^2$ and between which is a rack bar $f$, and mounted on the front top portion of the plate $e$ is a bracket or support $g$ which is connected with said plate by means of bolts $g^2$ movable in the slots $e^2$, and said bracket or support $g$ is movable on and vertically adjustable on the plate $e$.

The bracket or support $g$ is provided with transverse bearings $g^3$, and mounted therein is a transverse shaft $g^4$ provided centrally with a gear $g^5$ adapted to operate in connection with the rack bar $f$, and at one end with a ratchet wheel $g^6$, and said bracket or support is also provided with a forwardly directed annular bowl holder $g^7$, and connected with the bracket or support $g$ is a pawl $h$ which operates in connection with the ratchet $g^6$, and one end of the shaft $g^4$ is also provided with a crank $i$ by which said shaft may be turned.

In order to move the bowl holder $g^7$ vertically, all that is necessary is to raise the pawl $h$ and the shaft $g^4$ may be turned by means of the crank $i$ and the bracket or support $g$ together with the bowl $d$, if the bowl is mounted in the holder $g^7$, may be raised or lowered to any desired extent.

By means of my improvement, if the bowl $d$ be in position as shown in Fig. 1 and the eggs thoroughly beaten, all that is necessary to remove said bowl with the eggs therein is to lower the bowl holder $g^7$ when the bowl may be removed or detached from its holder or support without in any way interfering with the shaft $c$ or the beater $c^2$, and whenever desired the bowl may be replaced in the holder and the holder again raised into the position shown in Fig. 1.

Having fully described my invention, what I claim as new and desire to secure by Letters Patent, is:—

In an egg beating machine of the class described, a vertical support, a stationary arm connected therewith, an egg beater shaft connected with said arm, a vertically adjustable bracket mounted beneath said arm and provided with a forwardly directed annular bowl holder, and means for adjusting said bracket vertically, comprising a stationary rack bar connected with said support, a shaft passing through said bracket and provided with a gear operating in connection with said rack bar, and means for locking said shaft in any desired position.

In testimony that I claim the foregoing as my invention I have signed my name in presence of the subscribing witnesses this 8th day of August 1907.

WILLIAM R. CHITTENDEN.

Witnesses:
C. E. MULREANY,
A. R. APPLEMAN.